US006349813B1

(12) United States Patent
Offerman et al.

(10) Patent No.: US 6,349,813 B1
(45) Date of Patent: Feb. 26, 2002

(54) ESCALATOR ROLLER DEGRADATION MONITOR DEVICE

(75) Inventors: Kirk Von Offerman, Ellicott City, MD (US); Robert T. North, Mandeville, LA (US); Melanie Jean Smith, Bedminster; Michael D. Kao, North Plainfield, both of NJ (US); Roger L. Frazier, Aspers, PA (US); William G. Bonitz, Burtonsville, MD (US)

(73) Assignee: Inventio AG, Hergiswil NW (CH)

( * ) Notice: Subject to any disclaimer, the term of this patent is extended or adjusted under 35 U.S.C. 154(b) by 0 days.

(21) Appl. No.: 09/468,567

(22) Filed: Dec. 21, 1999

(51) Int. Cl.[7] .......................................... B65G 43/00

(52) U.S. Cl. .................................... 198/328; 198/502.1

(58) Field of Search ................................ 198/323, 321, 198/502.1

(56) References Cited

U.S. PATENT DOCUMENTS 5,096,040 A * 3/1992 Wente et al. ............... 198/323
5,236,075 A 8/1993 Bartmann .................. 198/323

FOREIGN PATENT DOCUMENTS

| | | | | |
|---|---|---|---|---|
| JP | 0034285 | * | 3/1978 | ................. 198/323 |
| SU | 0850541 | * | 7/1981 | ................. 198/323 |
| WO | 9702205 | | 1/1997 | ........... B66B/29/00 |

* cited by examiner

*Primary Examiner*—Christopher P. Ellis
*Assistant Examiner*—Khoi H. Tran
(74) *Attorney, Agent, or Firm*—Schweitzer Corman Gross & Bondell LLP

(57) ABSTRACT

A roller degradation monitor device monitors the diameter of escalator rollers during operation of the escalator. A cam plate is mounted proximate the roller track for sequential contact with the upper circumference of rollers as they travel along the track. The vertical displacement of the cam plate is monitored by a proximity switch or sensor, differences in cam plate practice from an established baseline signifying variations in roller diameter. The output of the proximity switch or sensor provides a continuous measure of wear and decrease in diameter of the rollers. When the wear exceeds a predetermined value an alarm can be actuated.

8 Claims, 1 Drawing Sheet

ESCALATOR ROLLER DEGRADATION MONITOR DEVICE

The present invention relates to a new and improved apparatus for monitoring the wear of the rollers utilized in escalators and similar conveyers and generating a signal when the roller has worn beyond a specified amount.

BACKGROUND OF THE INVENTION

Escalators and similar conveyor-like devices which incorporate a series of moving platforms or step elements that are typically mounted for travel along a closed loop of a guidance track. As the rollers are primary load-bearing means for the steps or platforms, they are subject to continuous wear. It is important that the rollers be monitored for the extent of wear to prevent degradation in escalator performance or failure. Heretofore inspection of the rollers would have been performed manually, requiring placing the escalator out of service for such inspection and often requiring some disassembly to allow service personnel access to the rollers. The entire length of the step or platform components would have to be inspected.

It is accordingly a purpose of the present invention to provide an apparatus which allows the automated monitoring of the roller condition of escalators and similar conveyor-like devices.

A further purpose of the present invention is to provide an apparatus which allows monitoring of escalator rollers and the like to be performed on a continuous basis.

Still a further purpose of the present invention is to provide such an apparatus which allows continuous monitoring of the condition of escalator rollers and the like during operation, and which can generate a signal which alerts maintenance personnel that such maintenance or service of the escalator is due.

BRIEF DESCRIPTION OF THE DRAWINGS

A fuller understanding of the present invention will be obtained upon consideration of the following detailed description of a preferred, but nonetheless illustrative embodiment of the invention, when reviewed in conjunction with the annexed drawings, wherein.

DETAILED DESCRIPTION OF THE INVENTION

Figure 1:
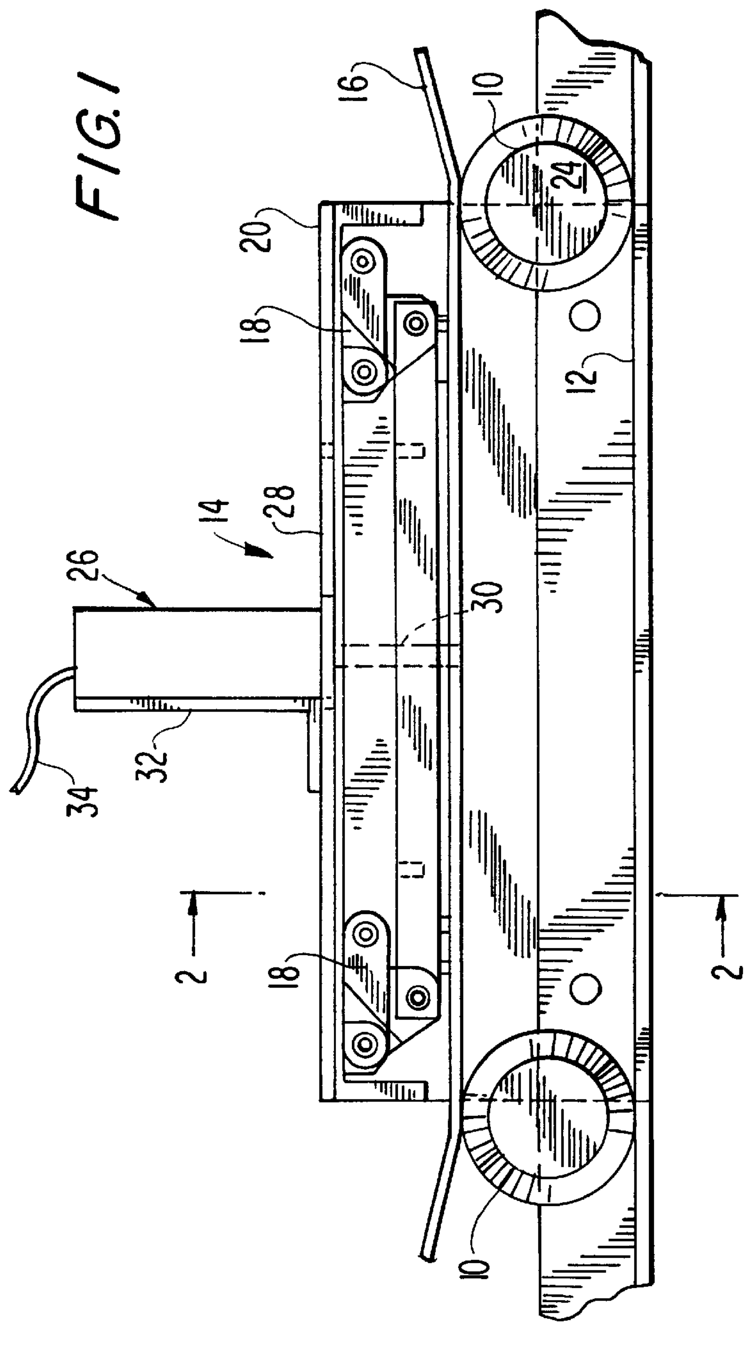
FIG. 1 is a side elevation view of the present invention mounted in conjunction with an escalator roller assembly.
Figure 2:
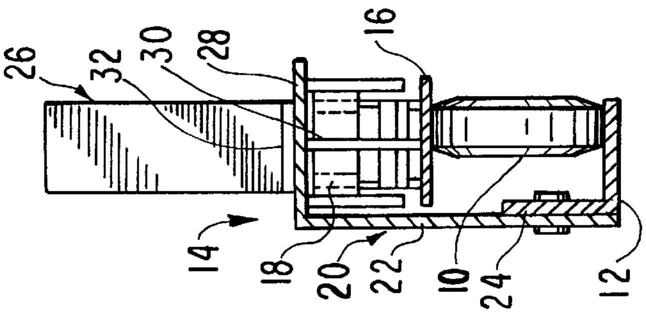
FIG. 2 is a sectional elevation view taken along line 2—2 in FIG. 1.

With reference to the Figures, escalator rollers 10, of which only two are shown in FIG. 1, are ganged together in a continuous chain, and are constrained to travel along a roller track 12. The track describes a continuous closed path along which the rollers run, the rollers being affixed to the traveling escalator steps, which are driven by an appropriate motor source (not shown). Wear-sensing apparatus 14 comprises a cam or similar sensor plate 16 mounted by a pair of linkages 18 to apparatus bracket 20. As shown, bracket 20 may be in the form of an inverted L, the vertical leg 22 of which being affixed to the vertical side wall portion 24 of escalator roller track 12 by the use of appropriate fasteners, such as rivets or shallow head bolts. A proximity switch or sensor 26 is mounted by support 32 to the horizontal leg 28 of the bracket 20, and has an activator 30. As known in the art, the proximity switch is capable of generating an electrical signal representing the vertical positioning of the cam plate. The linkages 18 allow the cam plate to rest upon the rollers 10, under the influence of gravity, whereby the output of the proximity switch 26 reflects the height of the cam plate which is in turn indicative of the diameter of the rollers. As the rollers wear their diameter decreases, the cam plate further dropping, the proximity sensor subsequently generating a changed signal reflective of such a change. While the proximity switch depicted in the figures is shown having a mechanical-type activator 30, it is to be recognized that the proximity switch may also be of the non-contact type, where the distance of the cam plate from the proximity switch is determined without the need for a physical connection therebetween. The cable 34 couples the switch output, either in the form of an alarm signal or in the form of a proportional output for further processing, to the associated alarm or processing circuitry and equipment as known.

Preferably, the length of the cam plate is such that one roller is inspected individually for at least one-half revolution. Prior to the roller leaving the cam plate the next roller is introduced to reduce motion of the cam plate. As known in the art, the linkages 18 are chosen to be of the type that maintains the cam plate parallel to the roller track, so that the position of the cam plate is not influenced by the position of the roller as it passes thereunder. Other types of linkages, such as a hinge having its pivot axis parallel to the direction of travel for the rollers, that is, along the length of the cam plate, can similarly be employed. This prevents the proximity switch from generating an erroneous signal resulting from cocking of the cam plate as a roller travels therealong and reduces the need for processing software to determine the position of a roller to compensate therefor. With the apparatus mounted above the rollers, typically on the return side of the track, the cam rests on the rollers under the influence of gravity, thus eliminating the need for external biasing, such as a spring mechanism, to maintain the roller in contact with the cam and track with excess wear on the roller. If necessary, however, a slight spring force may be added to insure roller contact with the track and cam and thus generate true diameter readings.

The proximity switch or sensor 26 may be of the proportional type, generating an output corresponding to the position of the actuator or may be of the on/off type, whereby the switch is preset to change state at a given position of the actuator, corresponding to a wear displacement of a chosen degree. With a proportional-type sensor, the electronics associated with the proximity switch 26 can provide for adjustability in the amount of wear which generates an output signal. Typically, wear on the order of ⅛ inch from the original diameter of the rollers should trigger an output. Such output may be in the form of a remote indicator, such as a lamp, and may also include an interlock function which shuts down the escalator automatically, requiring manual acknowledgment of the signal and resetting thereof. Alternatively, or in conjunction with other signaling, a continuous readout of the roller diameter and/or its wear from an initial size may be displayed.

We claim:

1. An apparatus for monitoring the wear of escalator rollers traveling along a track, said track forming a closed path for the rollers, comprising a bracket mounted to the track;

a proximity switch mounted to the bracket and having an actuator;

and a cam plate coupled to the actuator positioned and arranged for contact with at least one of the rollers as the rollers travel along the track;

the proximity switch generating a signal when the displacement of the cam plate as a result of roller wear equals or exceeds a preset value.

2. The apparatus of claim 1, wherein the proximity switch is of the proportional type.

3. The apparatus of claim 1, wherein the cam plate is positioned and arranged for continuous contact with one of the rollers as the roller makes at least one half of a revolution along the track.

4. The apparatus of claim 2, wherein the cam plate is positioned and arranged for contact with the rollers by gravity.

5. The apparatus of claim 4, wherein the cam plate is connected to the bracket by a linkage for maintaining the cam plate parallel to the track.

6. The apparatus of claim 3 wherein the cam plate has a roller contact length equal to a spacing between adjacent rollers.

7. The apparatus of claim 3, wherein the cam plate is positioned and arranged for contact with the rollers by gravity.

8. The apparatus of claim 7, wherein said cam plate is connected to the bracket by a linkage for maintaining the cam plate parallel to the track.

* * * * *